United States Patent
Ishii et al.

(10) Patent No.: US 6,815,573 B2
(45) Date of Patent: Nov. 9, 2004

(54) METHOD OF DECOMPOSING HALOGENATED HYDROCARBON GAS

(75) Inventors: Jun Ishii, Fukuyama (JP); Tatsuro Ariyama, Fukuyama (JP); Toshihiko Okada, Fukuyama (JP); Minoru Asanuma, Fukuyama (JP); Michinori Hattori, Tokyo (JP)

(73) Assignee: NKK Corporation, Tokyo (JP)

( * ) Notice: Subject to any disclaimer, the term of this patent is extended or adjusted under 35 U.S.C. 154(b) by 0 days.

(21) Appl. No.: 10/007,111

(22) Filed: Dec. 3, 2001

(65) Prior Publication Data

US 2002/0141911 A1 Oct. 3, 2002

Related U.S. Application Data

(63) Continuation of application No. PCT/JP00/03652, filed on Jun. 6, 2000.

(30) Foreign Application Priority Data

Jun. 7, 1999 (JP) .......................................... 11-159288

(51) Int. Cl.$^7$ ................................................ A62D 3/00
(52) U.S. Cl. ...................... 588/213; 588/206; 588/209; 588/210; 588/212; 423/240 R; 423/240 S
(58) Field of Search ................................ 588/209, 210, 588/213, 216; 423/240 S; 502/305, 311, 312, 313, 319, 321, 338, 325, 326, 337, 339, 349, 350, 178

(56) References Cited

U.S. PATENT DOCUMENTS 4,631,183 A * 12/1986 Lalancette et al. .......... 110/237
5,238,656 A * 8/1993 Tajima et al. ................ 422/171
5,362,468 A * 11/1994 Coulon et al. ........... 423/445 R
5,417,934 A * 5/1995 Smith et al. ................. 422/171
5,645,808 A * 7/1997 Krause ........................ 423/210
5,759,504 A   6/1998 Kanno et al.
5,951,852 A * 9/1999 Fookes ...................... 208/262.1
2002/0013507 A1 * 6/2001 Taneaki et al. .............. 588/213

FOREIGN PATENT DOCUMENTS

| DE | 3624509 A | * 6/1988 | .......... G01N/21/84 |
| JP | 4-63131 A |   2/1992 | |
| JP | 4-176326 A |   6/1992 | |
| JP | 6-343827 A |   12/1994 | |
| JP | 8-38853 A |   2/1996 | |
| JP | 8-229354 A |   9/1996 | |
| JP | 9-168773 A |   6/1997 | |
| JP | 9-276691 A |   10/1997 | |
| JP | 10-180040 A |   7/1998 | |
| JP | 11-221440 A |   8/1999 | |

OTHER PUBLICATIONS

English translation of the International Preliminary Examination Report dated Aug. 20, 2001 in parent application PCT/JP00/03652.

* cited by examiner

Primary Examiner—Stuart L. Hendrickson
Assistant Examiner—Peter J Lish
(74) Attorney, Agent, or Firm—Frishauf, Holtz, Goodman & Chick, P.C.

(57) ABSTRACT

A method and an apparatus for decomposing halogenated hydrocarbon gas economically and stably without relying on any special treatment and without generating dioxins. A catalyst to decompose halogenated hydrocarbon gas, 4, is supported on a carrier 3. A target gas, which contains the halogenated hydrocarbon gas, is passed through the carrier 3, while heating the carrier 3 using an electromagnetic induction heating mechanism 5, 6.

16 Claims, 1 Drawing Sheet

METHOD OF DECOMPOSING HALOGENATED HYDROCARBON GAS

This application is a continuation application of International Application PCT/JP00/03652 filed Jun. 6, 2000 which was not published under PCT Article 21(2) in English.

FIELD OF THE INVENTION

The present invention relates to a method for decomposing halogenated hydrocarbon gas and an apparatus therefor, particularly relates to a method and an apparatus for efficiently decomposing and detoxifying ozone layer destruction materials such as chlorofluorocarbons specified by relating laws.

BACKGROUND OF THE INVENTION

Halogenated hydrocarbons include organic chlorine base solvents and chlorofluorocarbons. They are generally stable in terms of chemical and thermal, soluble in oil, and highly volatile. Owing to these properties, they are consumed in various industrial sectors in large quantities. For example, organic chlorine base solvents are used as washing liquids in dry cleaning and as degreasing washing agents for metals, and chlorofluorocarbons are used as coolants in air conditioners and as resin foaming agents. Once, however, they are released to atmosphere, they induce serious environmental problems such as ozone layer destruction and global warming. Furthermore, some of them are identified to cause carcinogenesis and teratogenesis in human body.

There have been proposed various kinds of technologies for decomposing and treating them as means to avoid these problems. For instance, JP-A-10-180040, (the term "JP-A" referred herein signifies the "unexamined Japanese patent publication"), discloses a method for decompose chlorofluorocarbon gas by combusting it with hydrogen, methane, and the like mixing there together. According to the method, a supporting gas such as methane and hydrogen is added to the chlorofluorocarbon gas in a cylindrical burner to improve the combustibility, while mixing these components in a swirling flow pattern to homogenize the combustion, (the combustion method).

According to a method disclosed in JP-A-9-276691, chlorofluorocarbons are hydrolyzed in a high frequency plasma decomposition furnace, and the generated carbon dioxide and hydrogen are combusted by introducing air there into, (the plasma decomposition method).

According to a method disclosed in JP-A-10-180040, a gas that contains organic chlorine compounds is introduced to pass through a plurality of ultraviolet ray irradiation reactors structured by a combination of complete mixing and incomplete mixing types, thus attaining efficient photo-decomposition treatment, (the UV decomposition method).

According to a method disclosed in JP-A-8-38853, halogen-containing waste is decomposed by hydrolysis under the presence of super-critical water at high temperature and high pressure and by oxidation decomposition reaction using an oxygen-containing fluid, (the super-critical water decomposition method).

According to a method disclosed in JP-A-6-343827, contacting with a catalyst made of silicon carbide that supports platinum efficiently decomposes a gas that contains chlorofluorocarbons. The use of platinum-supporting silicon carbide as the catalyst carrier improves corrosion resistance to hydrogen chloride generated during the decomposition of the chlorofluorocarbons, thus assuring long period of stable catalyst activity.

As of the above-described prior art, the combustion method, the plasma decomposition method, the UV decomposition method, and the super-critical water decomposition method cannot be said as satisfactory methods for detoxifying halogenated hydrocarbon gas in large quantities, efficiently, and safely, though they show a certain level of decomposition treatment effect to haloganated hydrocarbons. For example, the combustion method requires high temperatures of 700° C. or above, and raises problems that free halogen forms severely corrosive gases (hydrogen fluoride, hydrogen chloride, and the like) to corrode the combustion furnace. Furthermore, the method has a difficulty in temperature control. The plasma decomposition method is high in running cost relating to electricity and plasma gas, which induces economical problem. The UV decomposition method has a limit of scale up of UV lamp and of quartz jacket, so that the method is not suitable for treating large quantity of gas. The super-critical water decomposition method requires high temperatures of 400° C. or above and high pressures of 320 atm or more.

Contrary to these technologies, the catalyst decomposition method has advantages of effective treatment at a relatively low temperature and of simple treatment apparatus. However, the catalyst used in the catalyst decomposition method is generally expensive, so that, once catalyst degradation is generated caused from non-uniform heating of catalyst by an external heating electric heater, the frequency of catalyst replacement increases to decrease the economy. In addition, when a metal is used as the catalyst carrier, the halogen-containing gas such as halogenated hydrogen gas may degrade the carrier.

The inventors of the present invention conducted detailed analysis of a decomposed gas, which was generated during the catalyst decomposition using an external heating electric heater as the heating source, and found that dioxins existed in the decomposed gas.

SUMMARY OF THE INVENTION

The present invention has been completed responding to the above-described situation. And an object of the present invention is to provide a method and an apparatus for decomposing haloganated hydrocarbon gas, which method and apparatus decompose halogenated hydrocarbon gas economically and stable, in large quantities, without generating dioxins, without relying on any special treatment.

To solve the above-described problems, the present invention provides the following-described method and apparatus.

Firstly, the present invention provides a method for decomposing halogenated hydrocarbon gas in a gas that contains the halogenated hydrocarbon gas. The method comprises the step of supporting a catalyst for decomposing the halogenated hydrocarbon gas on a carrier, which is electrically conductive and is resistant to halogen-containing gas. Furthermore, the first method comprises the step of decomposing the halogenated hydrocarbon gas by letting the gas that contains the halogenated hydrocarbon gas pass through the carrier, while heating the carrier by electromagnetic induction heating.

In the method for decomposing halogenated hydrocarbon gas, the carrier preferably comprises at least one material selected from the group consisting of SiC and stainless steel.

In the method for decomposing halogenated hydrocarbon gas, the catalyst preferably comprises at least one element selected from the group consisting of Pt, Pd, Au, Rh, and Ni.

In the method for decomposing halogenated hydrocarbon gas, the catalyst preferably comprises at least one element selected from the group consisting of W, Cr, Fe, Mo, and V.

In the method for decomposing halogenated hydrocarbon gas, the catalyst preferably comprises: at least one element selected from the group consisting of Pt, Pd, Au, Rh, and Ni, and/or at least one element selected from the group consisting of W, Cr, Fe, Mo, and V; and titania ($TiO_2$).

Secondly, the present invention provides a method for decomposing halogenated hydrocarbon gas. The method comprises the step of decomposing a halogenated hydrocarbon gas by letting a gas that contains the halogenated hydrocarbon gas pass through a heating body which is resistant to halogen-containing gas and is electrically conductive, while heating the heating body by electromagnetic induction heating.

In the method for decomposing halogenated hydrocarbon gas, the heating body is preferably a structure made of at least one material selected from the group consisting of SiC and stainless steel.

Thirdly, the present invention provides an apparatus for decomposing halogenated hydrocarbon gas. The apparatus comprises a carrier which supports a catalyst for decomposing the halogenated hydrocarbon gas, which is resistant to halogen-containing gas and is electrically conductive, and which allows a gas that contains halogenated hydrocarbon to pass through there. Furthermore, the apparatus comprises a heating mechanism to heat the carrier by electromagnetic induction heating.

Fourthly, the present invention provides an apparatus for decomposing halogenated hydrocarbon gas. The apparatus comprises a heating body which is resistant to halogen-containing gas and is electrically conductive, and which allows a gas that contains halogenated hydrocarbon gas passing through there. Furthermore, the apparatus provides a heating mechanism to heat the heating body by electromagnetic induction heating.

The inventors of the present invention speculated that the generation of dioxins in the conventional catalyst decomposition method is caused by the following reasons. That's to say, the external heating electric heater used as the heating means is difficult to cool the decomposed gas owing to the radiant heat thereof, and the decomposed gas is held at a temperature level of dioxin re-synthesis temperatures. Thus, the inventors of the present invention expected that the use of an electromagnetic induction heating method as the heating method that can perform rapid heating and rapid cooling prevents that kind of disadvantage. That is, since the electromagnetic induction heating method is able to perform rapid heating and rapid cooling, the dioxin re-synthesis temperature zone can be passed within a short time, thus preventing the re-synthesis of dioxins. In addition, the electromagnetic induction heating allows uniform heating so that the occurrence of catalyst degradation caused by non-uniform heating is prevented. Furthermore, the use of a catalyst carrier, which is resistant to halogen-containing gas, allows performing detoxification that decomposes halogenated hydrocarbon gas for a long period. Furthermore, sole electromagnetic induction heating, not applying any special treatment, allows treating large quantity of gas, economically.

Combustion and oxidation without using catalyst can decompose halogenated hydrocarbon gases. Accordingly, as described above in a part, when a heating body through which the gas passes is installed, instead of the catalyst carrier, and when the heating body is heated by electromagnetic induction heating to combust and oxidize to decompose the halogenated hydrocarbon gas, similar effect with the use of a catalyst can be attained.

DESCRIPTION OF THE PREFERRED EMBODIMENT

Figure 1:
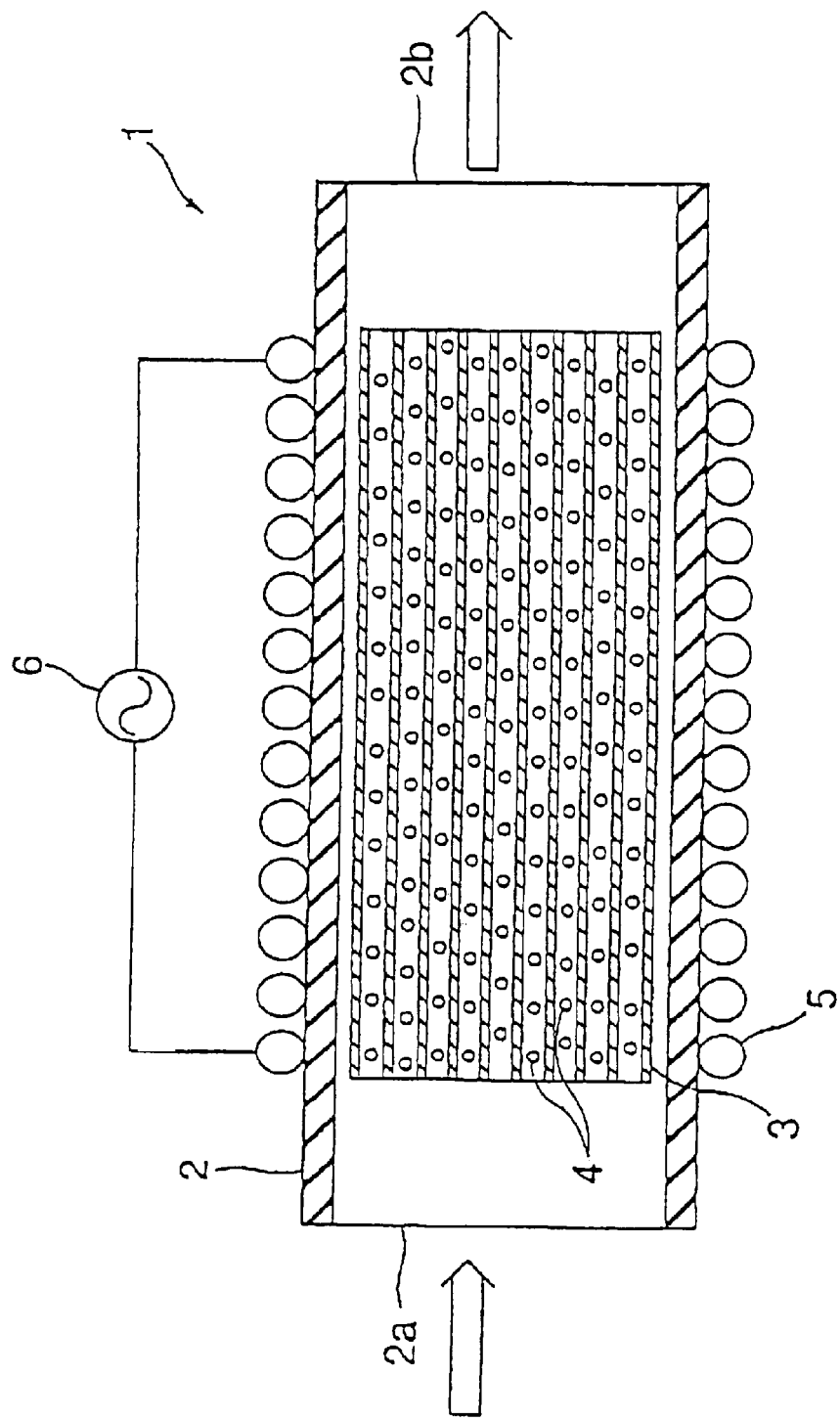
FIG. 1 shows a cross section of an example of apparatus for decomposing halogenated hydrocarbon gas, used in a mode for carrying out the present invention.

The following is the description of the best mode for carrying out the present invention.

FIG. 1 shows a cross section of an apparatus for decomposing halogenated hydrocarbon gas, used in the present invention. The decomposition apparatus 1 comprises: an insulation cylindrical container 2; a carrier 3 supporting a catalyst 4, located in the cylindrical container 2; an electromagnetic induction coil 5 wound around outside of the cylindrical container 2; and a high frequency power source 6 that supplies high frequency waves to the electromagnetic induction coil 5.

The cylindrical container 2 receives a gas that contains halogenated hydrocarbon gas such as chlorofluorocarbons from an opening 2a, and discharges decomposed gas from another opening 2b.

The carrier 3 of the decomposition catalyst 4 is made of a material that is electrically conductive and that has resistance to the halogenated hydrocarbon gas and the halogen-containing gas generated from the decomposition of the halogenated hydrocarbon gas, or has a superior corrosion resistance in a halogen-containing gas atmosphere. The carrier 3 is electrically conductive to heat the carrier 3 by the Joule heat of eddy current generated by an electromagnetic induction coil 5. An example of applicable materials for the carrier 3 is carbon ceramics such as SiC. By forming the carrier 3 in honeycomb or resembling shape, the contact efficiency between the catalyst and the halogenated hydrocarbons is improved, further the problem of gas drift is eliminated.

Examples of preferred decomposition catalyst 4 are the one containing at least one element selected from the group (1st group element) comprising of Pt, Pd, Au, Rh, and Ni, which have high corrosion resistance to halogenated hydrogen, and the one containing at least one element selected from the group (2nd group elements) comprising of W, Cr, Fe, Mo, and V. More preferred decomposition catalyst 4 contains the 1st group element or the 2nd group element, and $TiO_2$, and most preferred decomposition catalyst 4 contains all of the 1st group element, the 2nd group element, and $TiO_2$. A decomposition catalyst that contains all of the 1st group element, the 2nd group element, and $TiO_2$ shows high performance providing a function to decompose halogenated hydrocarbon gas and a function to decompose hydrocarbon gas.

The above-described 1st group element and 2nd group element may be applied as an element or as a compound. However, the above-described 1st group element is preferably used as an element, and the above-described 2nd group element is preferably used in a form of compound, such as oxide, nitride, and sulfide. Preferred compound of the above-described 2nd group element includes $WO_3$, $CrO_3$, $Fe_2O_3$, $MoO_3$, and $V_2O_5$. As of these, $WO_3$ is particularly preferred. The combination of Pt—$WO_3$—$TiO_2$ being contained in a catalyst that contains all of the above-described 1st group element, 2nd group element, and $TiO_2$ is most preferred because of providing high-halogenated hydrocarbon decomposition performance even at low temperatures.

Examples of applicable materials that can be treated according to the present invention are various kinds of chlorofluorocarbons represented by CFC11 ($CFCl_3$) and CFC12 ($CF_2Cl_2$). With the selection of optimum operating condition, the present invention is effective not only to chlorofluorocarbons but also various kinds of halogenated hydrocarbon gases including volatile organic compounds (VOC's) such as tetrachloroethylene and dioxins-containing gases.

For decomposing halogenated hydrocarbon gases using that kind of decomposition apparatus 1, power is supplied from the high frequency power source 6 to the electromagnetic induction coil 5 to induce eddy current in the carrier 3. Through electromagnetic induction heating using the Joule heat generated from the eddy current, the carrier 3 is heated to a working temperature of the decomposition catalyst 4. In that state, a gas that contains halogenated hydrocarbon gas is introduced from the opening 2a of the cylindrical container 2 to pass the gas through the carrier 3.

On the passage of passing through the carrier 3, the gas that contains halogenated hydrocarbon gas receives the action of generated heat of the heated carrier 3 and the action of the decomposition catalyst, thus the contained halogenated hydrocarbon gas is decomposed, for example, to HCl, HF, and $CO_2$. The gas after decomposed is discharged from the opening 2b of the cylindrical container 2.

Preferred temperatures for decomposing halogenated hydrocarbon gas are from 200 to 800° C., and more preferably from 300 to 500° C. Lower temperatures than the above-specified range degrade the catalyst life, and the corrosion of rector caused from acidifying gas should become severe.

In this manner, since the heating is conducted by electromagnetic heating method, the decomposition temperature passes the temperature zone of dioxin re-synthesis within a short time so that the re-synthesis of dioxins can be prevented, and also the catalyst degradation caused from non-uniform heating is difficult to occur. In addition, since the carrier 3 has resistance to halogen-containing gas, detoxification decomposing halogenated hydrocarbon gas can be performed for a long period.

The above-described apparatus decomposes halogenated hydrocarbons by the action of the heat generation of the carrier 3 and by the action of the decomposition catalyst 4. However, the carrier 3 may be used solely as a heat generation body, without using the decomposition catalyst, and the heat generation action can decompose halogenated hydrocarbons through the combustion and oxidization actions. In the combustion and oxidization decomposition of halogenated hydrocarbons using the high temperature heat generation from the electromagnetic induction heating body, without using a catalyst, higher decomposition temperatures are required, and the preferred decomposition temperatures are 800 to 1,200° C.

The present invention is further described referring to examples in the following.

EXAMPLE 1

A miniature flow reactor having a structure shown in FIG. 1 was used to decompose CFC12 ($CF_2Cl_2$). The decomposition catalyst was platinum (Pt) which was supported on a porous SiC honeycomb (produced by Ibiden Co., Ltd.) having 2 cm in diameter and 4 cm in length. For oxidation decomposition of CFC, air was supplied. Further for preventing degradation of catalyst activity, steam was introduced.

| The decomposition condition is given below. | |
|---|---|
| Decomposition temperature: | 500° C. |
| CFC concentration: | 1.5 vol. % |
| Gas flow rate: | 1,500 cc/hr |
| Electromagnetic induction frequency: | 100 kHz |

Table 1 shows the operating condition, the decomposition rate, and the dioxins concentration.

As shown in Table 1, the decomposition rate was as high as 99.0%, and the catalyst activity was degraded very little even after 200 hours of operation. The dioxin concentration in the flue gas was as low as 0.1 ng-TEQ/$Nm^3$ or less.

EXAMPLE 2

Experiment was carried out under the condition of Example 1, CFC12 decomposition, while changing the catalyst to a metallic oxide ($WO_3$). The decomposition conditions including the shape and size of honeycomb, the decomposition temperature, the CFC concentration, the gas inflow rate (air, steam), and the inverter frequency (electromagnetic induction frequency) were set to the same values with those in Example 1.

Table 1 shows the operating condition, the decomposition rate, and the dioxin concentration.

As shown in Table 1, the CFC decomposition rate was as high as around 93%, though the level is lower than that of Example 1 (Pt catalyst supported). Similar with Example 1, about 200 hours of continuous operation was conducted. The decomposition rate was almost constant, and the degradation of catalyst activity was very little. The dioxin concentration in the flue gas was also at a low level of 0.1 ng-TEQ/$Nm^3$ or less.

EXAMPLE 3

Using a miniature flow reactor having a structure shown in FIG. 1, a combustion oxidation decomposition experiment for CFC12 was carried out applying the high temperature heat generation from a SiC honeycomb. The applied SiC honeycomb had the same shape and size with those in Example 1. Methane gas as the supporting gas was added other than air as the carrier. The operational temperature was set to a high level to enhance the efficient decomposition of CFC12 and to suppress the dioxin synthesis.

| The decomposition condition is given below. | |
|---|---|
| Decomposition temperature: | 800° C. |
| CFC12 concentration: | 1.5 vol. % |
| Methane concentration: | 1.0 vol. % |
| Gas flow rate: | 1,500 cc/hour |

Table 1 shows the operating condition, the decomposition rate, and the dioxins concentration.

As seen in Table 1-a and Table 1-b, the CFC12 decomposition rate was about 85%, which is inferior to that of the decomposition method using catalyst as in Examples 1 and 2. The dioxin concentration in the flue gas was low level of 0.1 ng-TEQ/$Nm^3$ or less.

Comparative Example 1

Using a miniature flow reactor, an experiment for decomposing CFC12 was carried out under the same conditions including the reaction temperature with those of Example 1, except for using an external peripheral direct heating instead of the electromagnetic induction heating.

Tables 1a and 1b show the operating condition, the decomposition rate, and the dioxins concentration.

As shown in Tables 1a and 1b, the initial decomposition rate was relatively high, giving about 86.0%, though it was lower than that of Example 1 (electromagnetic induction heating). However, the catalyst activity degraded after 10 hours, and the decomposition rate decreased to 65% after 200 hours. In addition, dioxins were detected from the flue gas, giving as high as 5.1 ng-TEQ/Nm$^3$.

Comparative Example 2

Using a miniature flow reactor, an experiment for decomposing CFC12 was carried out under the same conditions including the reaction temperature with those of Example 2, except for using an external peripheral direct heating instead of the electromagnetic induction heating.

Tables 1a and 1b show the operating condition, the decomposition rate, and the dioxins concentration.

As seen in Tables 1a and 1b, the CFC decomposition rate was further low compared with that in Comparative Example 1. The catalyst activity decreased with time, and the CFC decomposition rate reduced to about 57% after 200 hours. In addition, dioxins were detected from the flue gas, giving as high as 4.8 ng-TEQ/Nm$^3$.

TABLE 1a

| | Heating method | Catalyst | Reaction temperature (° C.) |
|---|---|---|---|
| Example 1 | Electromagnetic induction heating | Pt | 500 |
| Example 2 | Electromagnetic induction heating | WO$_3$ | 500 |
| Example 3 | Electromagnetic induction heating | None | 800 |
| Comparative Example 1 | External peripheral heating | Pt | 500 |
| Comparative Example 2 | External peripheral heating | WO$_3$ | 500 |

TABLE 1b

| | CFC12 decomposition rate (%) | | | | Dioxin concentration (ng-TEQ/Nm$^3$) |
|---|---|---|---|---|---|
| | 10 hr | 50 hr | 100 hr | 200 hr | |
| Example 1 | 99 | 99 | 99 | 99 | 0.1 or less |
| Example 2 | 93 | 93 | 93 | 93 | 0.1 or less |
| Example 3 | 85 | 85 | 85 | 85 | 0.1 or less |
| Comparative Example 1 | 86 | 81 | 74 | 65 | 5.1 |
| Comparative Example 2 | 80 | 76 | 69 | 57 | 4.8 |

EXAMPLE 4

Using the miniature flow reactor having a structure shown in FIG. 1, decomposition of CFC12 (CF$_2$Cl$_2$) was carried out. The decomposition catalyst applied was a combined catalyst of Pt—WO$_3$—TiO$_2$ with a molar ratio of Pt—WO$_3$—Ti$_2$O$_2$ as 1:5:94. Thus prepared catalyst was supported on a porous SiC honeycomb (lattice spacing of 3 mm) having 2 cm in diameter and 2 cm in length. The porous SiC was heated by electromagnetic induction heating to a specified decomposition temperature of the catalyst layer. The, CFC12 and air were introduced to the reactor at a CFC12 concentration of 3.25 vol. % and at a gas flow rate of 15,000 cc/hr. Furthermore, steam was introduced for enhancing the CFC hydrolysis and for preventing degradation of catalyst activity.

The decomposition condition is given below.

Applied catalyst: Pt—WO$_3$—TiO$_2$ (Pt:WO$_3$:TiO$_2$=1:5:94)

Applied carrier: SiC honeycomb carrier (2 cm in diameter, 2 cm in length, 3 mm in lattice spacing)

Decomposition temperature: 400° C.

CFC concentration: 3.25 vol. %

Gas flow rate: 1,500 cc/hr

Gas composition: CFC: H$_2$O: Air=1:3:30

Electromagnetic induction frequency: 100 kHz

Tables 2a and 2b show the operating condition, the decomposition rate, and the dioxin concentration. As seen in Tables 2a and 2b, the initial decomposition rate was as high as 99%. After 200 hours of continuous operation, the decomposition rate was stable, and the catalyst activity was degraded very little. The dioxin concentration in the flue gas was as low as 0.1 ng-TEQ/Nm$^3$ or less.

EXAMPLE 5

Relating to the decomposition of CFC12 applied in Example 4, an experiment was carried out changing the supported catalyst to a combination of Pt—TiO$_2$ adjusting the ratio of Pt to TiO$_2$ as 1:99 on molar basis. Other experimental conditions were the same with those of Example 4.

The decomposition condition is given below.

Applied catalyst: Pt—TiO$_2$ (Pt: TiO$_2$=1:99)

Applied carrier: SiC honeycomb carrier (2 cm in diameter, 2 cm in length, 3 mm in lattice spacing)

Decomposition temperature: 400° C.

CFC concentration: 3.25 vol. %

Gas flow rate: 1,500 cc/hr

Gas composition: CFC: H$_2$O: Air=1:3:30

Electromagnetic induction frequency: 100 kHz

Tables 2a and 2b show the operating condition, the decomposition rate, and the dioxins concentration.

As shown in Tables 2a and 2b, the initial decomposition rate was as high as around 85%, though the level is lower than that of Example 5. After 200 hours of continuous operation, the degradation of catalyst activity was very little. The dioxin concentration in the flue gas was also at a low level of 0.1 ng-TEQ/Nm$^3$ or less.

EXAMPLE 6

Using a miniature flow reactor having a structure shown in FIG. 1, a combustion oxidation decomposition experiment for CFC12 was carried out applying the high temperature heat generation from a SiC honeycomb. The applied SiC honeycomb had the same shape and size with those in Example 4. Methane gas as the supporting gas was added other than air as the carrier. The operational temperature was set to a high level to enhance the efficient decomposition of CFC12 and to suppress the dioxin synthesis.

The decomposition condition is given below.

Applied carrier: SiC honeycomb carrier (2 cm in diameter, 2 cm in length, 3 mm in lattice spacing)
Decomposition temperature: 800° C.
CFC concentration: 3.25 vol. %
Gas flow rate: 1,500 cc/hour
Gas composition: CFC: $CH_{4=3:5}$
Electromagnetic induction frequency: 100 kHz Tables 2a and 2b show the operating condition, the decomposition rate, and the dioxins concentration.

As seen in Table 2-a and Table 2-b, the initial decomposition rate was high about 78%, which is inferior to that of the catalyst decomposition method as in Examples 4 and 5. The variations in the decomposition rate with time were small, and the dioxins concentration in the flue gas was low level of 0.1 ng-TEQ/$Nm^3$ or less.

Comparative Example 3

Using a miniature flow reactor, an experiment for decomposing CFC12 was carried out under the same conditions including the reaction temperature with those of Example 4, except for using a tubular electric furnace of direct heating type instead of the electromagnetic induction heating.

Tables 2a and 2b show the operating condition, the decomposition rate, and the dioxins concentration.

As seen in Tables 2a and 2b, the initial decomposition rate was as high as 95%, though it is low compared with that in Example 4 (electromagnetic induction heating). The catalyst activity, however, decreased with time, and the decomposition rate reduced to about 72% after 200 hours. The degradation presumably caused from that the external peripheral heating method induced local non uniformity in heating the catalyst, particularly that a portion of catalyst where the temperature becomes high, (or heat spot), degrades the activity. In addition, dioxins were detected from the flue gas, giving as high as 3.5 ng-TEQ/$Nm^3$.

Comparative Example 4

Using a miniature flow reactor, an experiment for decomposing CFC12 was carried out under the same conditions including the reaction temperature with those of Example 4, except for using a tubular electric furnace of direct heating type instead of the electromagnetic induction heating.

Tables 2a and 2b show the operating condition, the decomposition rate, and the dioxins concentration.

As seen in Tables 2a and 2b, the initial decomposition rate was as high as 81%, though it is low compared with that in Example 5 (electromagnetic induction heating). However, the catalyst activity decreased with time, and the decomposition rate reduced to about 61% after 200 hours. In addition, dioxins were detected from the flue gas, giving as high as 4.2 ng-TEQ/$Nm^3$.

TABLE 2a

| | Heating method | Catalyst | Reaction temperature (° C.) |
|---|---|---|---|
| Example 4 | Electromagnetic induction heating | Pt-$WO_3$-$TiO_2$ | 400 |
| Example 5 | Electromagnetic induction heating | Pt-$TiO_2$ | 400 |
| Example 6 | Electromagnetic induction heating | None | 800 |
| Comparative Example 3 | External peripheral heating | Pt-$WO_3$-$TiO_2$ | 400 |
| Comparative Example 4 | External peripheral heating | Pt-$TiO_2$ | 400 |

TABLE 2B

| | CFC12 decomposition rate (%) | | | | Dioxin concentration (ng-TEQ/$Nm^3$) |
|---|---|---|---|---|---|
| | 10 hr | 50 hr | 100 hr | 200 hr | |
| Example 1 | 85 | 85 | 85 | 81 | 0.1 or less |
| Example 2 | 99 | 99 | 98 | 96 | 0.1 or less |
| Example 3 | 78 | 75 | 75 | 75 | 0.1 or less |
| Comparative Example 1 | 81 | 77 | 70 | 61 | 4.2 |
| Comparative Example 2 | 95 | 90 | 81 | 72 | 3.5 |

EXAMPLES 7 through 18

Catalysts A though H was prepared using a kneading method described below.

A 501.5 g of titanium sulfate solution (Ti $(SO_4)_2$ sol.) was dripped to 1,000% ml of water in a beaker at a rate of 20 ml/min to prepare a solution of titanium hydroxide, while spontaneously adding dripping aqueous ammonia ($NH_3$ sol.) to maintain pH of the aqueous solution to a range of from 6.5 to 7.5, and cooling the solution with ice not to raise the temperature of the titanium oxide solution. Thus prepared solution was filtered, and the ammonium sulfate generated in the solution was completely removed using pure water, thus separating the titanium hydroxide. To the prepared titanium hydroxide, small amount of pure water, 0.66 g of platinic chloride ($H_2PtCl_6 6H_2O$), and 5.64 g of ammonium tungstate ($5(NH_4)_2O12WO_3 5H_2O$) were added. The mixture was then kneaded in a kneader for 30 minutes. After that, a granulator was applied to extrude the kneaded mixture to form catalyst particles. The particles were dried at 120° C. for 24 hours, followed by firing in air at 500° C. for 3 hours to obtain Catalyst A (0.5 wt. % Pt-10 wt. % $WO_3/TiO_2$).

Similar procedure was applied to obtain Catalyst B having a composition of 2.0 wt. % Pt-10 wt. % $WO_3/TiO_2$, Catalyst C having a composition of 0.5 wt. % Pt-5 wt. % $WO_3/TiO_2$, Catalyst D having a composition of 0.5 wt. % Pt-20 wt. % $WO_3/TiO_2$, Catalyst E having a composition of 2.0 wt. % Pt-40 wt. % $WO_3/TiO_2$, Catalyst F having a composition of 0.1 wt. % Pt-10 wt. % $WO_3/TiO_2$, and Catalyst G having a composition of 6.0 wt. % Pt-10 wt. % $WO_3/TiO_2$. In addition, Pd and Au were separately added instead of Pt to prepare Catalyst H having a composition of 0.5 wt. % Pd-10 wt. % $WO_3/TiO_2$, and Catalyst I having a composition of 0.5 wt. % Au-10 wt. % $WO_3/TiO_2$, respectively.

Catalyst J was prepared by an immersion method described below.

To about 200 ml of water, 0.66 g of platinic chloride ($H_2PtCl_6 \cdot 6H_2O$) and 5.64 g of ammonium tungstate ($5(NH_4)_2O \cdot 12WO_3 \cdot 5H_2O$) were added. The mixture was heated to dissolve the ingredients. After that, 44.75 g of titania was added to the solution, and the solution was allowed to stand for 2 hours. The resulted particles were dried at 120° C. for 24 hours, followed by firing in air at 500° C. for 3 hours to obtain Catalyst I (0.5 wt. % Pt-10 wt. % $WO_3/TiO_2$)

A 5-ml aliquot of each of thus prepared catalysts was packed in a stainless steel tube of a fixed bed flow reactor. CFC12 that contained hydrocarbon (propane) was passed through the catalyst to determine the CFC decomposition rate and the hydrocarbon decomposition rate. The result is given in Table 3.

The result is the following.

Catalyst volume: 5 ml

Reaction temperature: 350° C.

Space velocity: 15,000 $h^{-1}$ (1,000 $h^{-1}$ only in Example 17 and Example 18)

Reaction gas flow rate: 1,250 ml/min

Reaction gas composition:

| | |
|---|---|
| CFC (CFC12) concentration | 2% |
| Hydrocarbon (propane) concentration | 1% |
| Steam/CFC molar ratio | 5 |
| Air | balance |

As seen in Table 3, Examples 7 through 18 proved that the catalysts containing Pt, $WO_3$, and $TiO_2$ decompose CFC12 at high efficiency, and decompose hydrocarbon at high efficiency, furthermore maintain these activities for a long period.

INDUSTRIAL APPLICABILITY

As described above, the present invention uses electromagnetic induction heating method. Therefore, compared with conventional external heating method using an electric heater, no radiation heat from external pipes exists, rapid heating and rapid cooling are available, and the cooling speed of gas after passing through the catalyst reaction bed is high. Thus, the generation of dioxins by re-synthesis from free halogens and hydrocarbons after the decomposition can be suppressed. Furthermore, the electromagnetic induction heating allows uniform heating to let the carrier uniformly generate heat by itself, thus the decomposition reaction can proceed on a whole catalyst surface at a same temperature, which increases the decomposition efficiency and prevents local degradation of catalyst performance caused by temperature distribution. As a result, the prolonged catalyst life reduces the operational cost. In addition, the use of a catalyst carrier, which is resistant to gases containing halogens, allows maintaining stable catalyst activity without degrading the carrier, even when it contacts with not only halogenated hydrocarbon gas but also the decomposition products such as hydrogen chloride and hydrogen fluoride. Thus a detoxification treatment of decomposing halogenated hydrocarbon gas is carried out for a long period. Furthermore, sole electromagnetic induction heating without relying on any special treatment makes it possible to treat in large quantities, economically.

Furthermore, combustion and oxidization without applying catalyst can decompose halogenated hydrocarbon gases. Therefore, installing a heating body through which the gas passes, instead of the catalyst carrier can attain the similar effect with that obtained by the use of a catalyst. And the similar effect can be obtained by heating the heating body by electromagnetic induction heating to combust and oxidize to decompose the halogenated hydrocarbon gas.

What is claimed is:

1. A method for decomposing a halogenated hydrocarbon gas comprising the steps of:

supporting a catalyst for decomposing the halogenated hydrocarbon gas on a carrier which is electrically conductive and resistant to a halogen-containing gas; and passing the gas containing the halogenated hydrocarbon through the carrier to decompose the halogenated hydrocarbon gas, while heating the carrier by an electromagnetic induction heating.

TABLE 3

| | | | Catalyst activity (%) | | | |
|---|---|---|---|---|---|---|
| | | | 2 hours after beginning | | 20 hours after beginning the test | |
| | Catalyst No. | Catalyst composition | CFC decomposition rate | Hydrocarbon decomposition rate | CFC decomposition rate | Hydrocarbon decomposition rate |
| Example 7 | A | 0.5 wt % Pt – 10 wt % $WO_3/TiO_2$ | 96.4 | 92.1 | 93.2 | 85.9 |
| Example 8 | B | 2.0 wt % Pt – 10 wt % $WO_3/TiO_2$ | 98.7 | 92.9 | 97.1 | 91.1 |
| Example 9 | C | 0.5 wt % Pt – 5 wt % $WO_3/TiO_2$ | 78.1 | 90.4 | 72.1 | 87.4 |
| Example 10 | D | 0.5 wt % Pt – 20 wt % $WO_3/TiO_2$ | 92.1 | 91.7 | 90.9 | 80.1 |
| Example 11 | E | 2.0 wt % Pt – 40 wt % $WO_3/TiO_2$ | 79.1 | 94.3 | 77.9 | 92.8 |
| Example 12 | F | 0.1 wt % Pt – 10 wt % $WO_3/TiO_2$ | 95.9 | 81.2 | 83.1 | 73.7 |
| Example 13 | G | 6.0 wt % Pt – 10 wt % $WO_3/TiO_2$ | 98.1 | 89.1 | 95.1 | 84.2 |
| Example 14 | H | 0.5 wt % Pd – 10 wt % $WO_3/TiO_2$ | 91.5 | 73.1 | 81.9 | 61.1 |
| Example 15 | I | 0.5 wt % Au – 10 wt % $WO_3/TiO_2$ | 89.4 | 83.7 | 79.0 | 79.8 |
| Example 16 | J | 0.5 wt % Pt – 10 wt % $WO_3/TiO_2$ | 67.8 | 78.6 | 65.1 | 74.7 |
| Example 17 | A | 0.5 wt % Pt – 10 wt % $WO_3/TiO_2$ | 99.4 | 97.9 | 99.1 | 96.8 |
| Example 18 | B | 2.0 wt % Pt – 10 wt % $WO_3/TiO_2$ | 99.8 | 98.8 | 99.6 | 98.7 |

2. The method of claim 1, wherein the carrier comprises at least one material selected from the group consisting of SiC and stainless steel.

3. The method of claim 1, wherein the catalyst comprises at least one element selected from the group consisting of Pt, Pd, Au, Rh, and Ni.

4. The method of claim 1, wherein the catalyst comprises at least one element selected from the group consisting of W, Cr, Fe, Mo, and V.

5. The method of claim 1, wherein the catalyst comprises (i) titania; (ii) at least one element selected from the group consisting of Pt, Pd, Au, Rh, and Ni; and (iii) at least one element selected from the group consisting of W, Cr, Fe, Mo, and V.

6. The method of claim 1, wherein the catalyst comprises (i) titania and (ii) at least one element selected from the group consisting of Pt, Pd, Au, Rh, and Ni.

7. The method of claim 1, wherein the catalyst comprises (i) titania and (ii) at least one element selected from the group consisting of W, Cr, Fe, Mo, and V.

8. The method of claim 1, wherein the carrier is made of a carbon ceramic.

9. The method of claim 8, wherein the carbon ceramic is SiC.

10. The method of claim 9, wherein the carrier is in the shape of a honeycomb.

11. The method of claim 1, wherein the halogenated hydrocarbon gas is decomposed at a temperature of 200 to 800° C.

12. The method of claim 11, wherein the temperature is 300 to 500° C.

13. The method of claim 12, wherein the catalyst is $Pt-WO_3-TiO_2$.

14. The method of claim 1, wherein dioxins are not generated; and the heating is uniform.

15. The method of claim 1, wherein a flue gas from the method has a dioxin concentration of 0.1 ng-TEQ/Nm$^3$ or less.

16. The method of claim 1, wherein the catalyst is selected from the group consisting of 0.5 wt % Pt-10 wt. % $WO_3$/$TiO_2$, 2.0 wt % Pt-10 wt. % $WO_3$/$TiO_2$, 0.5 wt. % Pt-5wt. % $WO_3$/$TiO_2$, 0.5 wt. % Pt-20 wt. % $WO_3$/$TiO_2$, 2.0 wt. % Pt-40 wt % $WO_3$/$TiO_2$, 0.1 wt. % Pt-10 wt. % $WO_3$/$TiO_2$, 6.0 wt. % Pt-10 wt. % $WO_3$/$TiO_2$, 0.5 wt. % Pd-10 wt. % $WO_3$/$TiO_2$ and 0.5 wt. % Au-10 wt. % $WO_3$/$TiO_2$.

* * * * *